US012413716B2

(12) United States Patent
Zhao et al.

(10) Patent No.: US 12,413,716 B2
(45) Date of Patent: *Sep. 9, 2025

(54) MULTI-LINE INTRA PREDICTION

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,773

(22) Filed: Jan. 5, 2024

(65) Prior Publication Data

US 2024/0146911 A1 May 2, 2024

Related U.S. Application Data

(63) Continuation of application No. 17/837,805, filed on Jun. 10, 2022, now Pat. No. 11,902,514, which is a
(Continued)

(51) Int. Cl.
*H04N 19/11* (2014.01)
*H04N 19/117* (2014.01)
*H04N 19/176* (2014.01)

(52) U.S. Cl.
CPC ........... *H04N 19/11* (2014.11); *H04N 19/117* (2014.11); *H04N 19/176* (2014.11)

(58) Field of Classification Search
CPC .... H04N 19/11; H04N 19/117; H04N 19/176; H04N 19/593
(Continued)

(56) References Cited

U.S. PATENT DOCUMENTS 10,491,893 B1 * 11/2019 Zhao ................... H04N 19/176
10,944,964 B2 * 3/2021 Zhao ................... H04N 19/593
(Continued)

FOREIGN PATENT DOCUMENTS

| JP | 2020-14198 A | 1/2020 |
| WO | 2017/190288 A1 | 11/2017 |
| WO | 2017/222326 A1 | 12/2017 |

OTHER PUBLICATIONS

Korean Office Action dated Jul. 11, 2023 in Korean Application No. 10-2022-7024880.
(Continued)

*Primary Examiner* — Christopher S Kelley
*Assistant Examiner* — Ana Picon-Feliciano
(74) *Attorney, Agent, or Firm* — Sughrue Mion, PLLC

(57) ABSTRACT

A method of and an apparatus for controlling intra prediction for decoding of a video sequence are provided. The method may include based on a reference line index signaling a first reference line nearest to a coding unit, among a plurality of reference lines adjacent to the coding unit, applying intra smoothing on one or more first reference lines comprising the first reference line, among the plurality of reference lines, and based on the intra smoothing being applied on the one or more first reference lines, applying a position-dependent intra prediction combination (PDPC) on one or more third reference lines comprising the first reference line, among the plurality of reference lines, while preventing application of the PDPC on one or more fourth reference lines other than the one or more third reference lines, among the plurality of reference lines.

17 Claims, 11 Drawing Sheets

Related U.S. Application Data continuation of application No. 17/172,591, filed on Feb. 10, 2021, now Pat. No. 11,418,778, which is a continuation of application No. 16/662,958, filed on Oct. 24, 2019, now Pat. No. 10,944,964, which is a continuation of application No. 16/199,891, filed on Nov. 26, 2018, now Pat. No. 10,491,893.

(60) Provisional application No. 62/724,575, filed on Aug. 29, 2018.

(58) Field of Classification Search
USPC .................................................. 375/240.12
See application file for complete search history.

(56) References Cited

U.S. PATENT DOCUMENTS

| | | | | |
|---|---|---|---|---|
| 11,418,778 | B2 * | 8/2022 | Zhao | H04N 19/117 |
| 11,902,514 | B2 * | 2/2024 | Zhao | H04N 19/593 |
| 2017/0359595 | A1 | 12/2017 | Zhang et al. | |
| 2018/0176587 | A1 | 6/2018 | Panusopone et al. | |
| 2018/0288425 | A1 | 10/2018 | Panusopone et al. | |
| 2018/0332284 | A1 | 11/2018 | Liu et al. | |
| 2018/0367814 | A1 | 12/2018 | Seregin et al. | |
| 2019/0141318 | A1 | 5/2019 | Li et al. | |

OTHER PUBLICATIONS

Chen et al., "Description of SDR, HDR and 360 video coding technology proposal by Qualcomm and Technicolor—low and high complexity versions", Joint Video Exploration Team (JVET) of ITU-T SG 16 WP 3 and ISO/IEC JTC 1/SC 29/WG 11, Document: JVET-J0021, San Diego, US, Apr. 10-20, 2018, pp. 1-43 (43 pages total).

Extended European Search Report dated Jun. 15, 2022 in European Application No. 19853798.7.

M. Albrecht et al., "Description of SDR, HDR, and 360 video coding technology proposal by Fraunhofer HHI", Joint Video Experts Team (JVET) of ITU-T SG 16 WP 3 and ISO/IEC JTC 1/SC 29/WG 11, 2018, Document: JVET-J0014-v4, pp. 1-117 (122 pages total).

Benjamin Bross et al., CE3: Multiple reference line intra prediction (Test 1.1.1,1.1.2,1.1.3 and 1.1.4), Joint Video Experts Team (JVET) of ITU-T SG 16 WP 3 and ISO/IEC JTC 1/SC 29/WG 11, 2018, Document: JVET-L0283, pp. 1-6 (6 pages total).

M. Albrecht et al., "Description of SDR, HDR and 360 video coding technology proposal by Fraunhofer HHI", ISO/IEC JTC 1/SC29/WG11, 2018, JVET-J0014 (56 pages total).

Leonardo Chiariglione,"Report of 122nd MPEG Meeting", ISO/IEC JTC 1/SC 29/WG 11, 2018, N17480 (392 pages total).

Communication dated Oct. 14, 2021 from the Korean Patent Office in Korean Application No. 10-2020-7030970.

Jianle Chen et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, JVET-E1001-v2, 2017, pp. 1-41 (44 pages total).

Benjamin Bross et al., "CE3-related: On the combination of multiple reference lines, bilateral reference line filtering, PDPC and 65 directional modes for intra prediction", Joint Video Experts Team (JVET) of ITU-T SG16 WP 3 and ISO/IEC JTC 1/SC 29/WG 11, JVET-K0348-v3, 2018, pp. 1-9 (9 pages total).

Po-Han Lin et al., "CE3: Number of extended reference line for intra prediction (Test 5.5.1 and 5.5.2)", Joint Video Exploration Team (JVET) of ITU-T SG 16 WP 3 and ISO/IEC JTC 1/SC 29/WG 11, JVET-K0277, 2018, pp. 1-3 (3 pages total).

Communication dated Nov. 9, 2021 from the Japanese Patent Office in Application No. 2020-560455.

Communication dated May 17, 2022 from the Chinese Patent Office in Chinese Application No. 201980035894.9.

* cited by examiner

FIG. 4    Decoder 310

FIG. 5    Encoder 303

FIG. 7
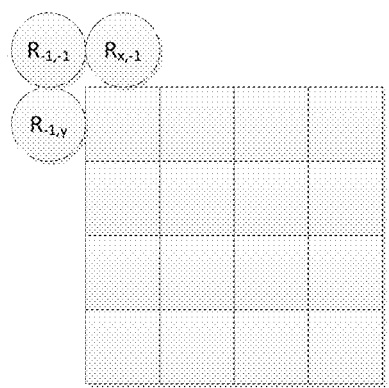
(a)
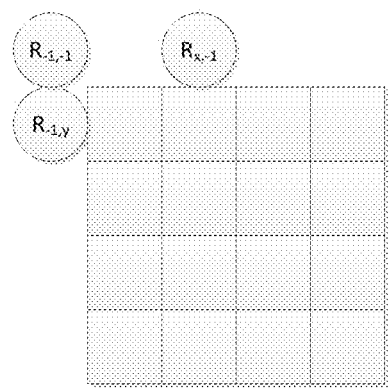
(b)

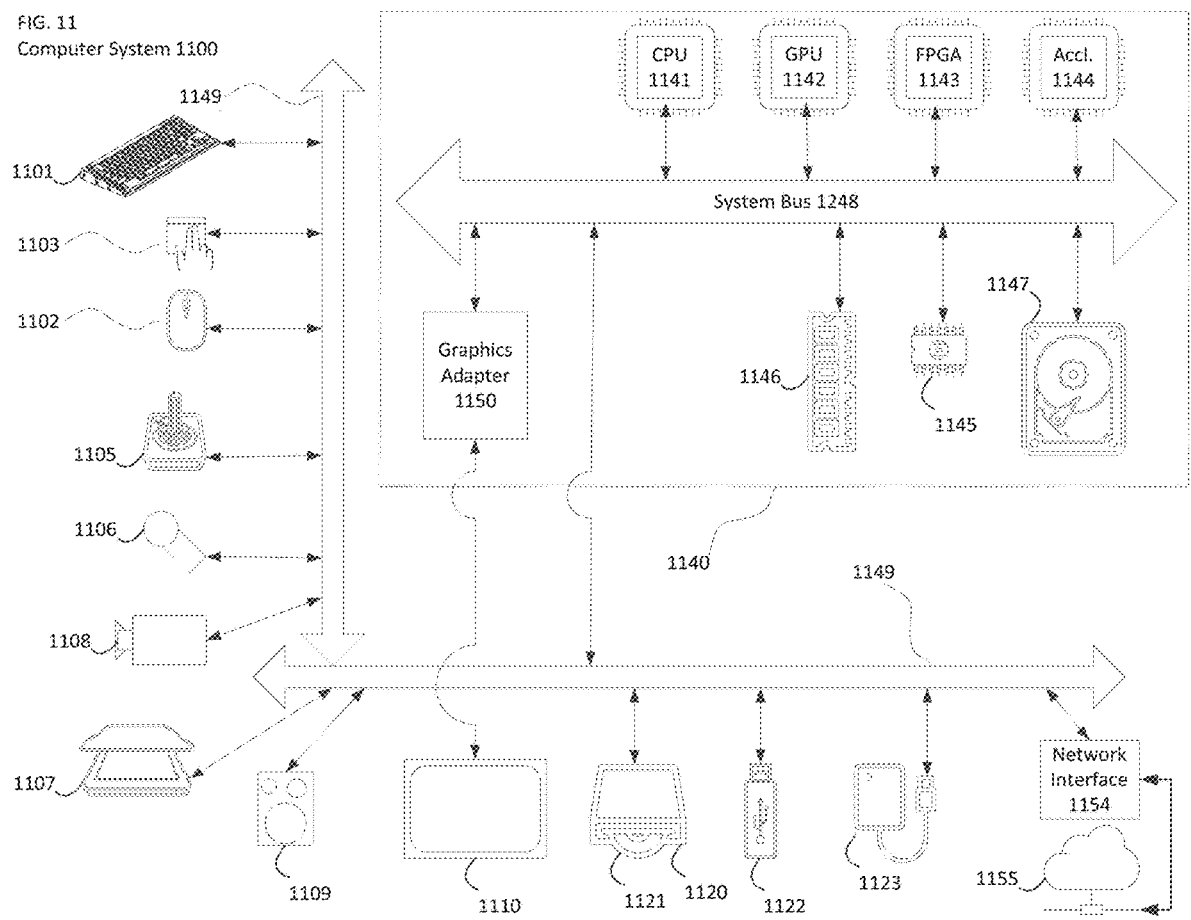

MULTI-LINE INTRA PREDICTION

CROSS-REFERENCE TO RELATED APPLICATION

This application is a Continuation Application of U.S. application Ser. No. 17/837,805, filed on Jun. 10, 2022, which is a Continuation Application of U.S. application Ser. No. 17/172,591, filed on Feb. 10, 2021, which issued as U.S. Pat. No. 11,418,778 on Aug. 16, 2022, which is a continuation of U.S. patent application Ser. No. 16/662,958, filed on Oct. 24, 2019, in the United States Patent and Trademark Office, which issued as U.S. Pat. No. 10,944,964 on Mar. 9, 2021, which is a continuation of U.S. patent application Ser. No. 16/199,891, filed on Nov. 26, 2018, in the United States Patent and Trademark Office, which issued as U.S. Pat. No. 10,491,893 on Nov. 26, 2019, which claims priority from U.S. Provisional Patent Application No. 62/724,575, filed on Aug. 29, 2018, in the United States Patent and Trademark Office, which are incorporated herein by reference in their entireties.

BACKGROUND

1. Field

Methods and apparatuses consistent with embodiments relate to video processing, and more particularly, a method and an apparatus for multi-line intra prediction.

2. Description of Related Art

Intra prediction modes used in High Efficiency Video Coding (HEVC) are illustrated in FIG. 1. In HEVC, there is a total of 35 intra prediction modes, among which mode 10 (101) is a horizontal mode, mode 26 (102) is a vertical mode, and mode 2 (103), mode 18 (104) and mode 34 (105) are diagonal modes. The intra prediction modes are signaled by three most probable modes (MPMs) and 32 remaining modes.

SUMMARY

According to embodiments, a method of controlling intra prediction for decoding of a video sequence may be provided. The method may include based on a reference line index signaling a first reference line nearest to a coding unit, among a plurality of reference lines adjacent to the coding unit, applying intra smoothing on one or more first reference lines comprising the first reference line, among the plurality of reference lines, and based on the intra smoothing being applied on the one or more first reference lines, applying a position-dependent intra prediction combination (PDPC) on one or more third reference lines comprising the first reference line, among the plurality of reference lines, while preventing application of the PDPC on one or more fourth reference lines other than the one or more third reference lines, among the plurality of reference lines.

According to embodiments, an apparatus for controlling intra prediction for decoding of a video sequence includes at least one memory configured to store computer program code, and at least one processor configured to access the at least one memory and operate according to the computer program code. The computer program code may include first applying code configured to cause the at least one processor to, based on a reference line index signaling a first reference line nearest to a coding unit, among a plurality of reference lines adjacent to the coding unit, apply intra smoothing on one or more first reference lines comprising the first reference line, among the plurality of reference lines, and second applying code configured to cause the at least one processor to, based on the intra smoothing being applied on the one or more first reference lines, apply a position-dependent intra prediction combination (PDPC) on one or more third reference lines comprising the first reference line, among the plurality of reference lines, while preventing application of the PDPC on one or more fourth reference lines other than the one or more third reference lines, among the plurality of reference lines.

According to embodiments, a non-transitory computer-readable storage medium storing instructions that cause a processor to, based on a reference line index signaling a first reference line nearest to a coding unit, among a plurality of reference lines adjacent to the coding unit, apply intra smoothing on one or more first reference lines comprising the first reference line, among the plurality of reference lines, and based on the intra smoothing being applied on the one or more first reference lines, apply a position-dependent intra prediction combination (PDPC) on one or more third reference lines comprising the first reference line, among the plurality of reference lines, while preventing application of the PDPC on one or more fourth reference lines other than the one or more third reference lines, among the plurality of reference lines.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description.

FIG. 7 is a diagram illustrating DC mode PDPC weights (wL, wT, wTL) for (0, 0) and (1, 0) positions inside one 4×4 block, in the VVC Draft 2.

FIG. 11 is a diagram of a computer system suitable for implementing embodiments.

DETAILED DESCRIPTION

Figure 1:
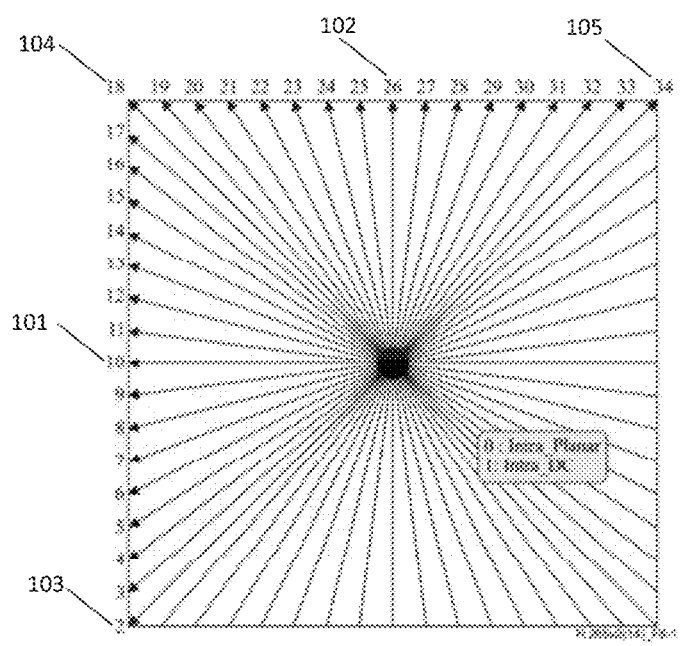
FIG. 1 is a diagram of intra prediction modes in HEVC.
Figure 2:
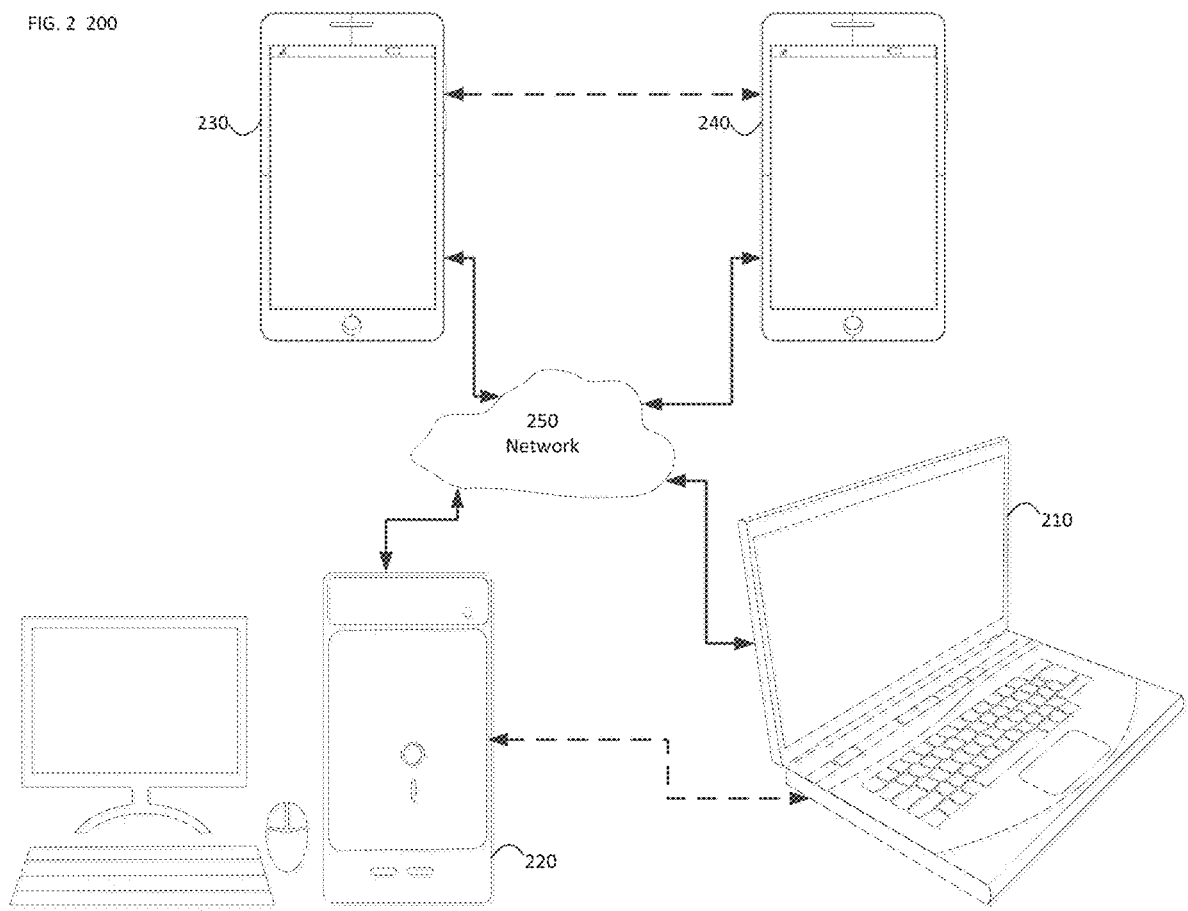
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
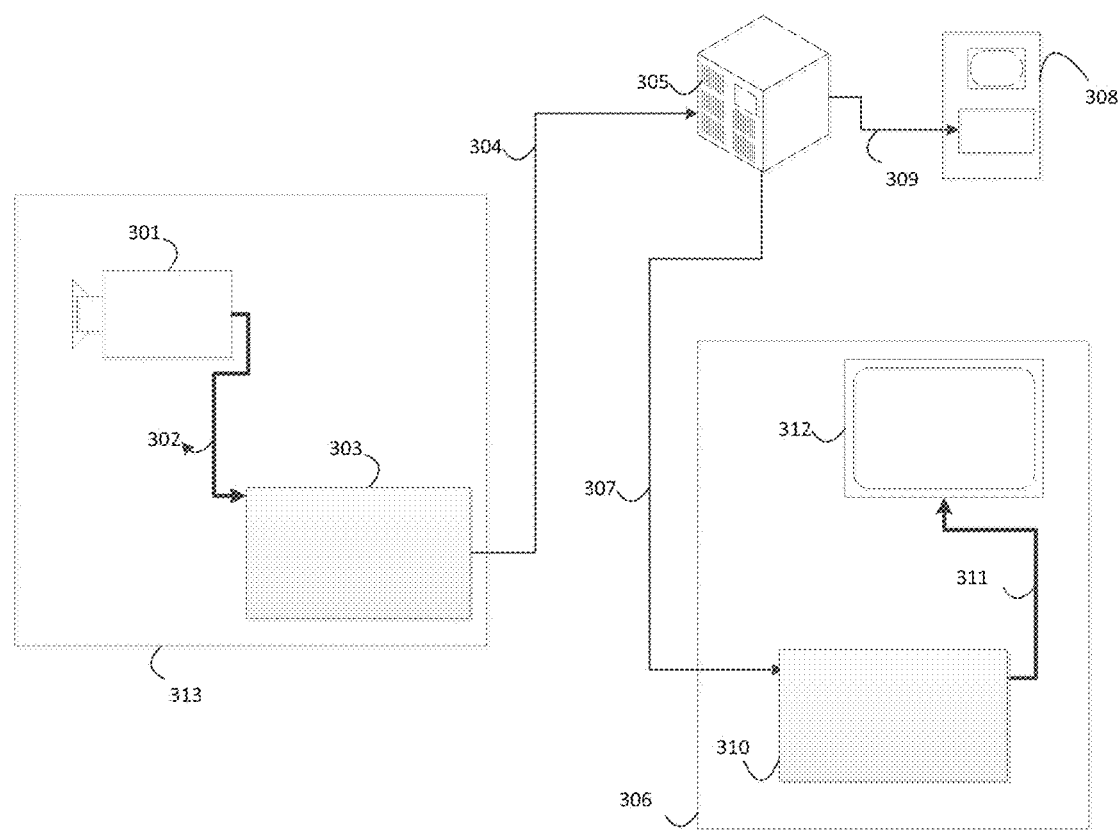
FIG. 3 is a diagram of a placement of a video encoder and a video decoder in a streaming environment, according to an embodiment.

FIG. 3 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
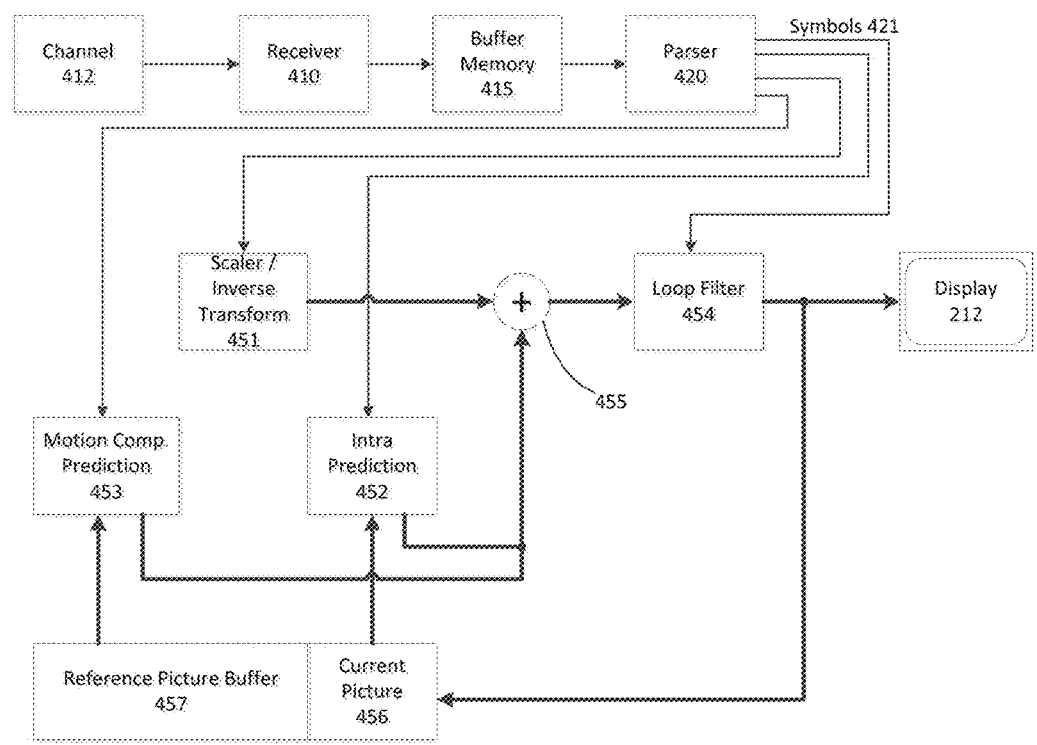
FIG. 4 is a functional block diagram of a video decoder according to an embodiment.

FIG. 4 is a functional block diagram of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
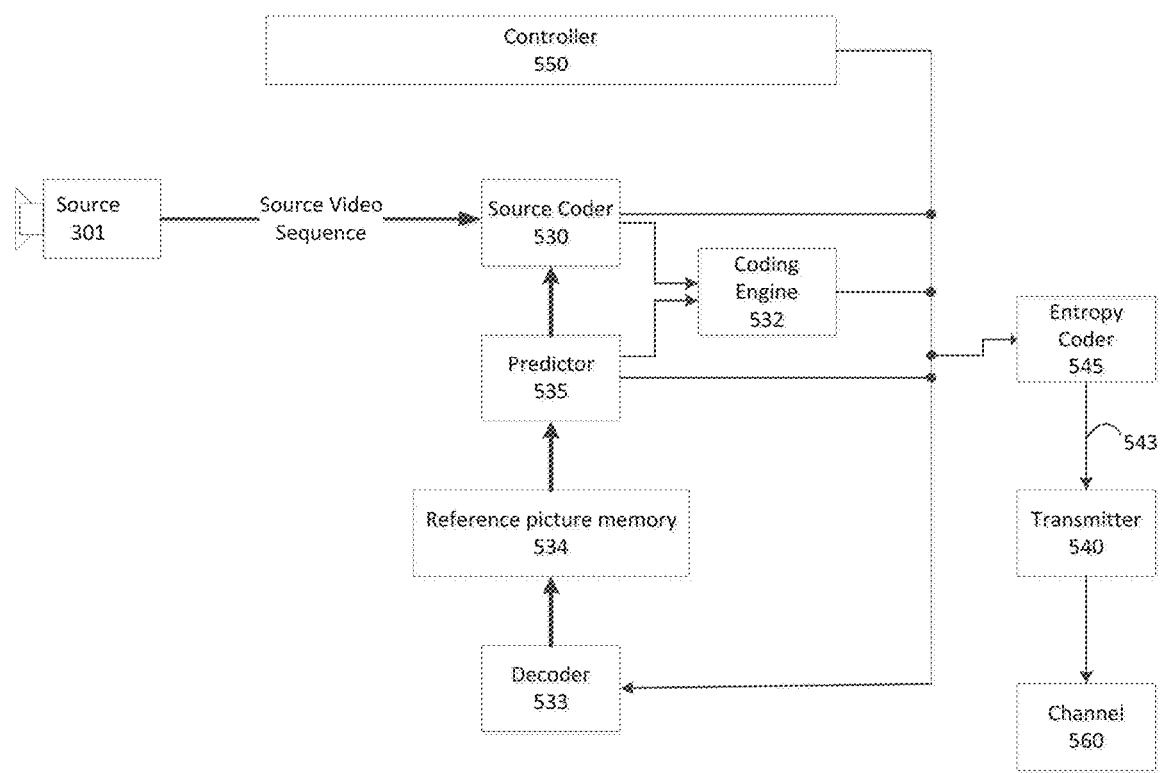
FIG. 5 is a functional block diagram of a video encoder according to an embodiment.

FIG. 5 is a functional block diagram of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550).

Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6:
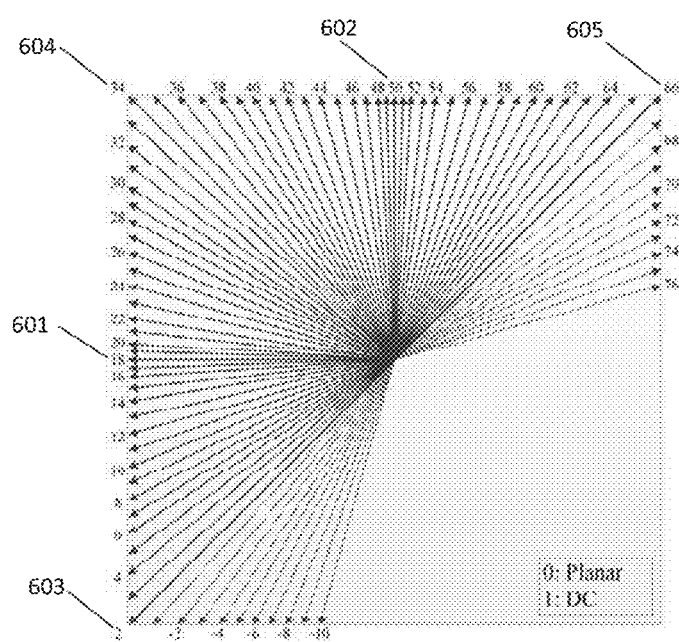
FIG. 6 is a diagram of intra prediction modes in Versatile Video Coding (VVC) Draft 2.

FIG. 6 is a diagram of intra prediction modes in VVC Draft 2.

In the VVC Draft 2, there is a total of 87 intra prediction modes as shown in FIG. 6, among which mode 18 (601) is a horizontal mode, mode 50 (602) is a vertical mode, and mode 2 (603), mode 34 (604) and mode 66 (605) are diagonal modes. Modes −1 to 10 and modes 67 to 76 are called Wide-Angle Intra Prediction (WAIP) modes.

A PDPC is applied to the following intra modes without signaling: a planar mode, a DC mode, the WAIP modes, horizontal mode, the vertical mode, a bottom-left angular mode (the mode 2 (603)) and its 8 adjacent angular modes (modes 3 to 10), and a top-right angular mode (mode 66 (605)) and its 8 adjacent angular modes (modes 58 to 65).

A prediction sample pred(x,y) located at position (x, y) is predicted using an intra prediction mode (DC, planar, angular) and a linear combination of reference samples, according to the following PDPC expression:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6, \quad \text{(Equation 1)}$$

where $R_{x,-1}$, $R_{-1,y}$ represent reference samples located at the top (T) and the left (L) of a current sample (x, y), respectively, and R−1, −1 represents a reference sample located at a top-left (TL) corner of the current block.

For the DC mode, weights (wL, wT, WTL) are calculated as follows for a block with dimensions of a width and a height:

$$wT = 32 >> ((y<<1) >> \text{shift}), wL = 32 >> ((x<<1) >> \text{shift}),$$
$$wTL = (wL >> 4) + (wT >> 4), \quad \text{(Equation 2)}$$

with shift=(log 2(width)−2+log 2(height)−2+2)>>2.

For the planar mode, wTL=0, for the horizontal mode, wTL=wT, and for the vertical mode, wTL=wL. The PDPC weights can be calculated with adds and shifts only. A value of pred(x,y) can be computed in a single step using Equation 1.

FIG. 7 is a diagram illustrating DC mode PDPC weights (wL, wT, wTL) for (0, 0) and (1, 0) positions inside one 4×4 block, in the VVC Draft 2.

Referring to FIG. 7, portion (a) illustrates DC mode PDPC weights (wL, wT, wTL) for a (0, 0) position inside one 4×4 block. Portion (b) illustrates DC mode PDPC weights (wL, wT, wTL) for a (1, 0) position inside one 4×4 block.

If the PDPC is applied to the DC, planar, horizontal, and vertical modes, additional boundary filters are not needed, such as an HEVC DC mode boundary filter or horizontal/vertical mode edge filters.

Portion (a) of FIG. 7 illustrates the definition of reference samples Rx, −1, R−1, y and R−1, −1 for the PDPC applied to the top-right angular or diagonal mode. A prediction sample pred(x', y') is located at (x', y') within the prediction block. The coordinate x of the reference sample Rx, −1 is given by: x=x'+y'+1, and the coordinate y of the reference sample R−1, y is similarly given by: y=x'+y'+1.

The following clause from the VVC Draft 2 describes the PDPC:

8.2.4.2.9 Position-Dependent Intra Prediction Combination Process

Inputs to this process are:
  the intra prediction mode predModeIntra,
  a variable nTbW specifying the transform block width,
  a variable nTbH specifying the transform block height,
  a variable refW specifying the reference samples width,
  a variable refH specifying the reference samples height,
  the predicted samples predSamples[x][y], with x=0 . . . nTbW−1 and y=0 . . . nTbH−1,
  the neighbouring samples p[x][y], with x=−1, y=−1 . . . refH−1 and x=0 . . . refW−1, y=−1,
  a variable cIdx specifying the colour component of the current block.

Outputs of this process are the modified predicted samples predSamples[x][y] with x=0 . . . nTbW−1, y=0 . . . nTbH−1.
Depending on the value of cIdx, the function clip1Cmp is set as follows:
  If cIdx is equal to 0, clip1Cmp is set equal to Clip1$_Y$.
  Otherwise, clip1Cmp is set equal to Clip1$_C$.
The variable nScale is set to ((Log 2(nTbW)+Log 2(nTbH)−2)>>2).
The reference sample arrays mainRef[x] and sideRef[y], with x=0 . . . refW and y=0 . . . refH are derived as follows:

$$\text{mainRef}[x] = p[x][-1]$$

$$\text{sideRef}[y] = p[-1][y] \quad (8\text{-}74)$$

The variables refL[x][y], refT[x][y], wT[y], wL[y] and wTL[x][y] with x=0 . . . nTbW−1, y=0 . . . nTbH−1 are derived as follows:
  If predModeIntra is equal to INTRA_PLANAR, INTRA_DC, INTRA_ANGULAR18, or INTRA_ANGULAR50, the following applies:

$$\text{refL}[x][y] = p[-1][y] \quad (8\text{-}75)$$

$$\text{refT}[x][y] = p[x][-1] \quad (8\text{-}76)$$

$$wT[y] = 32 >> ((y<<1) >> n\text{Scale}) \quad (8\text{-}77)$$

$$wL[x] = 32 >> ((x<<1) >> n\text{Scale}) \quad (8\text{-}78)$$

$$wTL[x][y] = (\text{predModeIntra} == \text{INTRA\_DC}) ? ((wL[x] >> 4) + (wT[y] >> 4)) : 0 \quad (8\text{-}79)$$

Otherwise, if predModeIntra is equal to INTRA_ANGULAR2 or INTRA_ANGULAR66, the following applies:

$$refL[x][y]=p[-1][x+y+1] \quad (8\text{-}80)$$

$$refT[x][y]=p[x+y+1][-1] \quad (8\text{-}81)$$

$$wT[y](32\!>\!>\!1)\!>\!>((y\!<\!<\!1)\!>\!>nScale) \quad (8\text{-}82)$$

$$wL[x](32\!>\!>\!1)\!>\!>((x\!<\!<\!1)\!>\!>nScale) \quad (8\text{-}83)$$

$$wTL[x][y]=0 \quad (8\text{-}84)$$

Otherwise, if predModeIntra is less than or equal to INTRA_ANGULAR10, the following ordered steps apply:
  The variables dXPos[y], dXFrac[y], dXInt[y] and dX[y] are derived as follows using invAngle as specified in clause 8.2.4.2.7 depending on intraPredMode:

$$dXPos[y]=((y+1)*invAngle+2)\!>\!>2$$

$$dXFrac[y]=dXPos[y]\&\ 63$$

$$dXInt[y]=dXPos[y]\!>\!>6$$

$$dX[y]=x+dXInt[y] \quad (8\text{-}85)$$

The variables refL[x][y], refT[x][y], wT[y],wL[y] and wTL[x][y] are derived as follows:

$$refL[x][y]=0 \quad (8\text{-}86)$$

$$refT[x][y]=(dX[y]\!<\!refW\!-\!1)?((64\!-\!dXFrac[y])*mainRef[dX[y]]+dXFrac[y]*mainRef[dX[y]+1]+32)\!>\!>6:0 \quad (8\text{-}87)$$

$$wT[y]=(dX[y]\!<\!refW\!-\!1)?32\!>\!>((y\!<\!<\!1)\!>\!>nScale):0 \quad (8\text{-}88)$$

$$wL[x]=0 \quad (8\text{-}89)$$

$$wTL[x][y]=0 \quad (8\text{-}90)$$

Otherwise, if predModeIntra is greater than or equal to INTRA_ANGULAR58, the following ordered steps apply:
  The variables dYPos[x], dYFrac[x], dYInt[x] and dY[x] are derived as follows using invAngle as specified in clause 8.2.4.2.7 depending on intraPredMode:

$$dYPos[x]=((x+1)*invAngle+2)\!>\!>2$$

$$dYFrac[x]=dYPos[x]\&\ 63$$

$$dYInt[x]=dYPos[x]\!>\!>6$$

$$dY[x]=x+dYInt[x] \quad (8\text{-}91)$$

The variables refL[x][y], refT[x][y], wT[y], wL[y] and wTL[x][y] are derived as follows:

$$refL[x][y]=(dY[x]\!<\!refH\!-\!1)?((64\!-\!dYFrac[x])*sideRef[dY[x]]+dYFrac[x]*sideRef[dY[x]+1]+32)\!>\!>6:0 \quad (8\text{-}92)$$

$$refT[x][y]=0 \quad (8\text{-}93)$$

$$wT[y]=0 \quad (8\text{-}94)$$

$$wL[x]=(dY[x]\!<\!refH\!-\!1)?32\!>\!>((x\!<\!<\!1)\!>\!>nScale):0 \quad (8\text{-}95)$$

$$wTL[x][y]=0 \quad (8\text{-}96)$$

Otherwise, refL[x][y], refT[x][y], wT[y], wL[y] and wTL[x][y] are all set equal to 0.

The values of the filtered samples filtSamples[x][y], with x=0 . . . nTbW−1, y=0 . . . nTbH−1 are derived as follows:

$$filtSamples[x][y]=clip1Cmp((refL[x][y]*wL+refT[x][y]*wT-p[-1][-1]*wTL[x][y]+(64-wL[x]-wT[y]+wTL[x][y])*predSamples[x][y]+32)\!>\!>6) \quad (8\text{-}97)$$

In the VVC Draft 2, for a luma component, neighboring samples used for intra prediction sample generations are filtered before a generation process, namely an intra smoothing process. The filtering is controlled by a given intra prediction mode and a transform block size. If the intra prediction mode is a DC mode or the transform block size is equal to 4×4, neighboring samples are not filtered. If a distance between the given intra prediction mode and a vertical mode (or a horizontal mode) is larger than a predefined threshold, the filtering process is enabled. For neighboring sample filtering, a [1, 2, 1]filter and a bi-linear filter are used.

The following clause from VVC Draft 2 describes the intra smoothing process:

8.2.4.2.4 Reference Sample Filtering Process
Inputs to this process are:
  the (unfiltered) neighbouring samples refUnfilt[x][y], with x=−1, y=−1 . . . refH−1 and x=0 . . . refW−1, y=−1,
  a variable nTbW specifying the transform block width,
  a variable nTbH specifying the transform block height,
  a variable refW specifying the reference samples width,
  a variable refH specifying the reference samples height,
  a variable cIdx specifying the colour component of the current block.
Outputs of this process are the reference samples p[x][y], with x=−1, y=−1 . . . refH−1 and x=0 . . . refW−1, y=−1.
The variable nTbS is set equal to (Log 2 (nTbW)+Log 2 (nTbH))>>1.
The variable whRatio is set equal to min(abs(Log 2(nTbW/nTbH)), 2).
The variable wideAngle is derived as follows:
  If all of the following conditions are true, wideAngle is set equal to 1.
    nTbW is greater than nTbH
    predModeIntra is greater than or equal to 2
    predModeIntra is less than (whRatio>1)?12:8
  Otherwise, if all of the following conditions are true, wideAngle is set equal to 1.
    nTbH is greater than nTbW
    predModeIntra is less than or equal to 66
    predModeIntra is greater than (whRatio>1)?56:60
  Otherwise, wideAngle is set to 0.
The variable filterFlag is derived as follows:
  If one or more of the following conditions is true, filterFlag is set equal to 0:
    predModeIntra is equal to INTRA_DC,
    cIdx is not equal to 0.
  Otherwise, the following applies:
    The variable minDistVerHor is set equal to Min(Abs(predModeIntra−50), Abs(predModeIntra−18)).
    The variable intraHorVerDistThres[nTbS] is specified in Table 8-4.
    The variable filterFlag is derived as follows:
      If minDistVerHor is greater than intraHorVerDistThres[nTbS] or wideAngle is equal to 1, filterFlag is set equal to 1.
      Otherwise, filterFlag is set equal to 0.

TABLE 8-4

Specification of intraHorVerDistThres[nTbS] for various transform block sizes

|  | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 20 | 14 | 2 | 0 | 20 | 0 |

For the derivation of the reference samples p[x][y] the following applies:
If filterFlag is equal to 1, the filtered sample values p[x][y] with x=−1, y=−1 ... refH−1 and x=0 ... refW−1, y=−1 are derived as follows:

$$p[-1][-1]=(refUnfilt[-1][0]+2*refUnfilt[-1][-1]+refUnfilt[0][-1]+2)>>2 \quad (8\text{-}20)$$

$$p[-1][y]=(refUnfilt[-1][y+1]+2*refUnfilt[-1][y]+refUnfilt[-1][y-1]+2)>>2 \text{ for } y=0 \ldots refH-2 \quad (8\text{-}21)$$

$$p[-1][refH-1]=refUnfilt[-1][refH-1] \quad (8\text{-}22)$$

$$pF[x][-1]=(refUnfilt[x-1][-1]+2*refUnfilt[x][-1]+refUnfilt[x+1][-1]+2)>>2 \text{ for } x=0 \ldots refW-2 \quad (8\text{-}23)$$

$$p[refW-1][-1]=refUnfilt[refW-1][-1] \quad (8\text{-}24)$$

Otherwise, the reference samples values p[x][y] are set equal to the unfiltered sample values refUnfilt[x][y] with x=−1, y=−1 ... refH−1 and x=0 ... refW−1, y=−1.

In the VVC Draft 2, multi-line intra prediction uses more reference lines for intra prediction, and an encoder decides and signals which reference line is used to generate an intra predictor. A reference line index is signaled before intra prediction modes, and planar and DC modes are excluded from the intra prediction modes in when a nonzero reference line index is signaled.

Figure 8:
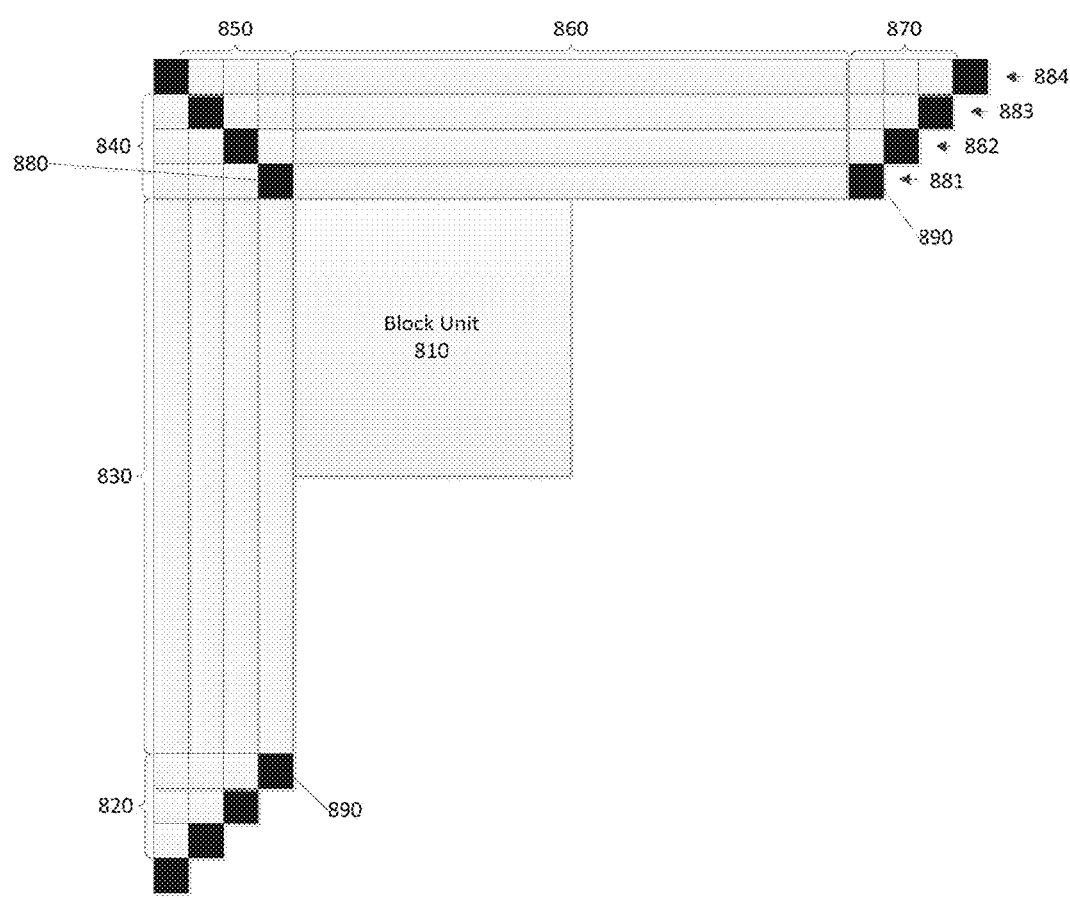
FIG. 8 is a diagram of four reference lines adjacent to a coding block unit, for intra prediction, according to an embodiment.

FIG. 8 is a diagram of four reference lines (881 to 884) adjacent to a coding block unit (810), for intra prediction, according to an embodiment.

Referring to FIG. 8, an example of 4 reference lines (881 to 884) is depicted, and each of the reference lines (881 to 884) is composed of six segments A to F (820 to 870). A top-left reference sample (880) to the top-left of the block unit (810) is also depicted in black. In addition, segments A and F (820 to 870) are padded with the closest samples (890) from segments B and E (830 and 860), respectively.

Referring again to FIG. 6, wide angles beyond a range of prediction directions covered by conventional intra prediction modes are indicated by dotted arrows, and respectively correspond to wide angular intra prediction modes. These wide angles may be applied for non-square blocks as follows:

Angles going beyond 45 degrees in a top-right direction (intra prediction mode 34 in HEVC) if a block width is larger than a block height.

Angles going beyond 45 degrees in a bottom-left direction (intra prediction mode 2 in HEVC) if the block height is larger than the block width.

The replaced modes are signaled using an original method and remapped to indices of the wide angular intra prediction modes after parsing. A total number of the intra prediction modes is unchanged, i.e., 35, and an intra mode coding is unchanged.

Currently, PDPC is applied to all reference lines. However, a PDPC process will make generated prediction samples similar by using different reference lines, which is not a desirable design.

Currently, intra smoothing is applied to all reference lines. However, an intra smoothing process will make reference samples in different lines much more closer, which is not a desirable design.

To address these problems, embodiments are discussed below, which may be used separately or combined in any order. In the following description, a line index of a nearest reference line is 0 (i.e., the reference line 881 of FIG. 8). A maximum signaled reference line number is denoted as N. Further, the term "PDPC" may refer to a simplified PDPC as described in the VVC Draft 2, clause 8.2.4.2.9.

In embodiments, the PDPC is applied on only the nearest reference line.

In embodiments, intra smoothing process is applied on only the nearest reference line.

In embodiments, the intra smoothing process is applied on only certain reference lines (i.e., 881 to 884 of FIG. 8). In an embodiment, the intra smoothing process is only applied to reference line 0 (i.e., 881 of FIG. 8) and 1 (i.e., 882 of FIG. 8). In another embodiment, the intra smoothing process is applied to reference lines 0 and 3 (i.e., 884 of FIG. 8). In still another embodiment, the intra smoothing process is applied to reference lines 0 and 2 (i.e., 883 of FIG. 8). In yet another embodiment, the intra smoothing process is not applied to one reference line, and the intra smoothing process is applied to all other reference lines. For example, the intra smoothing process is not applied to reference line 3.

In embodiments, the PDPC is applied on only certain selected reference lines. In an embodiment, the PDPC is only applied to reference lines 0 and 1. In another embodiment, the PDPC is applied to reference lines 0 and 3. In still another embodiment, the PDPC is applied to reference lines 0 and 2. In yet another embodiment, the PDPC is not applied to one reference line, and PDPC is applied to all other reference lines. For example, the PDPC is not applied to reference line 3.

In embodiments, the PDPC is applied on only non-zero reference lines (i.e., 882 to 884 of FIG. 8), but when it is applied to the non-zero reference lines, the PDPC is only applied to certain intra prediction modes. The following embodiments can be applied separately or combined in any order. In an embodiment, when a non-zero reference line is used, the PDPC is only applied to a planar mode and/or a DC mode. In another embodiment, when the non-zero reference line is used, the PDPC is only applied to horizontal and vertical modes. In still another embodiment, when the non-zero reference line is used, the PDPC is only applied to a diagonal mode (mode 2 or 66 as shown in FIG. 6). In yet another embodiment, when the non-zero reference line is used, the PDPC is only applied to intra prediction modes close to mode 2 and mode 66, for example, modes 3 to 10 and modes 58 to 65 as shown in FIG. 6. In yet another embodiment, when the non-zero reference line is used, the PDPC is only applied to WAIP modes.

In embodiments, different combinations of the PDPC and the intra smoothing process are used for different reference lines. In an embodiment, the PDPC and the intra smoothing is applied to reference line 0, only the PDPC is applied to reference line 1, only the intra smoothing is applied to reference line 2, and neither the PDPC nor the intra smoothing is applied to reference line 3. In another embodiment, if N is equal to 4, both the PDPC and the intra smoothing are applied to reference line 0, and/or there is at least one reference line for which either only the PDPC or the intra smoothing is applied, but not both, and/or there is at least one reference line for which neither the PDPC nor the intra smoothing is applied. In still another embodiment, if N is equal to 3, both the PDPC and the intra smoothing are applied to reference line 0, only the PDPC is applied to one of the non-zero reference lines, and neither the PDPC nor the intra smoothing is applied to one of the reference lines. In yet another embodiment, if N is equal to 3, both the PDPC and the intra smoothing is applied to reference line 0, only the intra smoothing is applied to at least one of the non-zero reference lines, neither the PDPC nor the intra smoothing is applied to at least one of the reference lines.

In embodiments, the planar and DC modes are also used for a non-zero reference line, but the PDPC and the intra smoothing for planar and DC modes in different reference lines are different. In an embodiment, the PDPC and the intra smoothing are applied to planar and DC modes in the nearest reference line, and the PDPC and the intra smoothing are not applied to the planar and DC modes in other reference lines. In another embodiment, the PDPC and the intra smoothing are applied to the planar and DC modes in the nearest reference line, either one or none of the PDPC and the intra smoothing is applied to the planar and DC modes in the non-zero reference lines.

In embodiments, the PDPC is not applied to wide angles for the non-zero reference lines.

In embodiments, the intra smoothing is not applied to wide angles for the non-zero reference lines.

In embodiments, the intra smoothing is reference line dependent. That is, the intra smoothing is applied for different intra prediction modes for different reference lines. Threshold values controlling which intra prediction modes close to horizontal/vertical modes are excluded from the intra smoothing are dependent on a reference line index. In an embodiment, intra prediction modes applying the intra smoothing for a certain reference line index are fully covered by intra prediction modes applying the intra smoothing for a smaller reference line index value, wherein the smaller reference line index value refers to a reference line closer to a current block to be predicted.

In embodiments, the intra prediction modes that used the PDPC are different for different reference lines. In an embodiment, the PDPC is applied to a vertical direction and a horizontal direction in reference line 0. However, in the non-zero reference lines, the PDPC is not applied to the vertical and horizontal directions.

The following text describes the text changes (using underlines and strikethroughs) using embodiments of disabling intra smoothing for a non-zero reference line, based on the VVC Draft 2.

8.2.4.2.1 General Intra Sample Prediction
Inputs to this process are:
  a sample location (xTbCmp, yTbCmp) specifying the top-left sample of the current transform block relative to the top-left sample of the current picture,
  a variable predModeIntra specifying the intra prediction mode,
  a variable nTbW specifying the transform block width,
  a variable nTbH specifying the transform block height,
  a variable refLine specifying the reference line index,
  a variable cIdx specifying the colour component of the current block.

Outputs of this process are the predicted samples predSamples[x][y], with x=0 . . . nTbW−1, y=0 . . . nTbH−1.
The variable whRatio is set equal to min(abs(Log 2(nTbW/nTbH)),2).
The variables refW and refH are derived as follows:

$$\mathrm{ref}W = (nTbH > nTbW) ? (nTbW + (nTbH >> whRatio) + \mathrm{Ceil}(nTbH/32)) : (nTbW*2) \qquad (8\text{-}15)$$

$$\mathrm{ref}H = (nTbW > nTbH) ? (nTbH + (nTbW >> whRatio) + \mathrm{Ceil}(nTbW/32)) : (nTbH*2) \qquad (8\text{-}16)$$

For the generation of the reference samples p[x][y] with x=−1, y=−1 . . . refH−1 and x=0 . . . refW−1, y=−1, the following ordered steps apply:
  1. The reference sample availability marking process as specified in clause 8.2.4.2.2 is invoked with the sample location (xTbCmp, yTbCmp), the reference sample width refW, the reference sample height refH, the colour component index cIdx as inputs, and the reference samples refUnfilt[x][y] with x=−1, y=−1 refH−1 and x=0 . . . refW−1, y=−1 as output.
  2. When at least one sample refUnfilt[x][y] with x=−1, y=−1 . . . refH−1 and x=0 . . . refW−1, y=−1 is marked as "not available for intra prediction", the reference sample substitution process as specified in clause 8.2.4.2.3 is invoked with the reference sample width refW, the reference sample height refH, the reference samples refUnfilt[x][y] with x=−1, y=−1 . . . refH−1 and x=0 . . . refW−1, y=−1, and the colour component index cIdx as inputs, and the modified reference samples refUnfilt[x][y] with x=−1, y=−1 . . . refH−1 and x=0 . . . refW−1, y=−1 as output.
  3. The reference sample filtering process as specified in clause 8.2.4.2.4 is invoked with the unfiltered samples refUnfilt[x][y] with x=−1, y=−1 . . . refH−1 and x=0 . . . refW−1, y=−1, the transform block width nTbW and height nTbH, the reference sample width refW, the reference sample height refH, the reference line index refLine, and the colour component index cIdx as inputs, and the reference samples p[x][y] with x=−1, y=−1 . . . refH−1 and x=0 . . . refW−1, y=−1 as output.

The intra sample prediction process according to predModeIntra applies as follows:
  If predModeIntra is equal to INTRA_PLANAR, the corresponding intra prediction mode process specified in clause 8.2.4.2.5 is invoked with the reference sample array p, the transform block width nTbW, and the transform block height nTbH as inputs, and the output is the predicted sample array predSamples.
  Otherwise, if predModeIntra is equal to INTRA_DC, the corresponding intra prediction mode process specified in clause 8.2.4.2.6 is invoked with the transform block width nTbW, the transform block height nTbH, and the reference sample array p as inputs, and the output is the predicted sample array predSamples.
  Otherwise if predModeIntra is equal to INTRA_CCLM, the corresponding intra prediction mode process specified in clause 8.2.4.2.8 is invoked with the sample location (xTbC, yTbC) set equal to (xTbCmp, yTbCmp), the prediction block width nTbW and height nTbH, and the reference sample array p as inputs, and the output is the predicted sample array predSamples.
  Otherwise, the corresponding intra prediction mode process specified in clause 8.2.4.2.7 is invoked with the intra prediction mode predModeIntra, the transform block width nTbW, the transform block height nTbH, the reference sample width refW, the reference sample height refH, and the reference sample array p as inputs, and the modified intra prediction mode predModeIntra and the predicted sample array predSamples as outputs. When one of the following conditions is true, the position-dependent prediction combination process specified in clause 8.2.4.2.9 is invoked with the intra prediction mode predModeIntra, the transform block width nTbW, the transform block height nTbH, the predicted samples predSamples [x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:
  predModeIntra is equal to INTRA_PLANAR
  predModeIntra is equal to INTRA_DC
  predModeIntra is equal to INTRA_ANGULAR18
  predModeIntra is equal to INTRA_ANGULAR50
  predModeIntra is less than or equal to INTRA_ANGULAR10
  predModeIntra is greater than or equal to INTRA_ANGULAR58

8.2.4.2.4 Reference Sample Filtering Process
Inputs to this process are:
  the (unfiltered) neighbouring samples refUnfilt[x][y], with x=−1, y=−1 . . . refH−1 and x=0 . . . refW−1, y=−1,
  a variable nTbW specifying the transform block width,
  a variable nTbH specifying the transform block height,
  a variable refW specifying the reference samples width,
  a variable refH specifying the reference samples height,
  a variable refLine specifying the reference line index,
  a variable cIdx specifying the colour component of the current block.
Outputs of this process are the reference samples p[x][y], with x=−1, y=−1 . . . refH−1 and x=0 . . . refW−1, y=−1.
The variable nTbS is set equal to (Log 2 (nTbW)+Log 2 (nTbH))>>1.
The variable whRatio is set equal to min(abs(Log 2(nTbW/nTbH)), 2).
The variable wideAngle is derived as follows:
  If all of the following conditions are true, wideAngle is set equal to 1.
    nTbW is greater than nTbH
    predModeIntra is greater than or equal to 2
    predModeIntra is less than (whRatio>1)?12:8
  Otherwise, if all of the following conditions are true, wideAngle is set equal to 1.
    nTbH is greater than nTbW
    predModeIntra is less than or equal to 66
    predModeIntra is greater than (whRatio>1)?56:60
  Otherwise, wideAngle is set to 0.
The variable filterFlag is derived as follows:
  If one or more of the following conditions is true, filterFlag is set equal to 0:
    predModeIntra is equal to INTRA_DC,
    cIdx is not equal to 0.
    refLine is not equal to 0.
  Otherwise, the following applies:
    The variable minDistVerHor is set equal to Min(Abs(predModeIntra−50), Abs(predModeIntra−18)).
    The variable intraHorVerDistThres[nTbS] is specified in Table 8-4.
    The variable filterFlag is derived as follows:
      If minDistVerHor is greater than intraHorVerDistThres[nTbS] or wideAngle is equal to 1, filterFlag is set equal to 1.
      Otherwise, filterFlag is set equal to 0.

TABLE 8-4

Specification of intraHorVerDistThres[nTbS] for various transform block sizes

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 20 | 14 | 2 | 0 | 20 | 0 |

For the derivation of the reference samples p[x][y] the following applies:
  If filterFlag is equal to 1, the filtered sample values p[x][y] with x=−1, y=−1 . . . refH−1 and x=0 . . . refW−1, y=−1 are derived as follows:

$$p[-1][-1] = (\text{refUnfilt}[-1][0] + 2*\text{refUnfilt}[-1][-1] + \text{refUnfilt}[0][-1] + 2) >> 2 \quad (8\text{-}20)$$

$$p[1-1][y] = (\text{refUnfilt}[-1][y+1] + 2*\text{refUnfilt}[-1][y] + \text{refUnfilt}[-1][y-1] + 2) >> 2 \text{ for } y = 0 \ldots \text{ref}H-2 \quad (8\text{-}21)$$

$$p[-1][\text{ref}H-1] = \text{refUnfilt}[-1][\text{ref}H-1] \quad (8\text{-}22)$$

$$pF[x][-1] = (\text{refUnfilt}[x-1][-1] + 2*\text{refUnfilt}[x][-1] + \text{refUnfilt}[x+1][-1] + 2) >> 2 \text{ for } x = 0 \ldots \text{ref}W-2 \quad (8\text{-}23)$$

$$p[\text{ref}W-1][-1] = \text{refUnfilt}[\text{ref}W-1][-1] \quad (8\text{-}24)$$

Otherwise, the reference samples values p[x][y] are set equal to the unfiltered sample values refUnfilt[x][y] with x=−1, y=−1 . . . refH−1 and x=0 . . . refW−1, y=−1.
The following text describes the text changes (using underlines and strikethroughs) using embodiments of disabling PDPC for a non-zero reference line, based on the latest version of the VVC Draft 2.
8.2.4.2.1 General Intra Sample Prediction
Inputs to this process are:
  a sample location (xTbCmp, yTbCmp) specifying the top-left sample of the current transform block relative to the top-left sample of the current picture,
  a variable predModeIntra specifying the intra prediction mode,
  a variable nTbW specifying the transform block width,
  a variable nTbH specifying the transform block height,
  a variable refLine specifying the reference line index,
  a variable cIdx specifying the colour component of the current block.
Outputs of this process are the predicted samples predSamples[x][y], with x=0 . . . nTbW−1, y=0 . . . nTbH−1.
The variable whRatio is set equal to min(abs(Log 2(nTbW/nTbH)), 2).
The variables refW and refH are derived as follows:

$$\text{ref}W = (nTbH > nTbW)?(nTbW + (nTbH >> wh\text{Ratio}) + \text{Ceil}(nTbH/32)):(nTbW*2) \quad (8\text{-}15)$$

$$\text{ref}H = (nTbW > nTbH)?(nTbH + (nTbW >> wh\text{Ratio}) + \text{Ceil}(nTbW/32)):(nTbH*2) \quad (8\text{-}16)$$

For the generation of the reference samples p[x][y] with x=−1, y=−1 . . . refH−1 and x=0 . . . refW−1, y=−1, the following ordered steps apply:

4. The reference sample availability marking process as specified in clause 8.2.4.2.2 is invoked with the sample location (xTbCmp, yTbCmp), the reference sample width refW, the reference sample height refH, the colour component index cIdx as inputs, and the reference samples refUnfilt[x][y] with x=−1, y=−1 refH−1 and x=0 . . . refW−1, y=−1 as output.

5. When at least one sample refUnfilt[x][y] with x=−1, y=−1 . . . refH−1 and x=0 . . . refW−1, y=−1 is marked as "not available for intra prediction", the reference sample substitution process as specified in clause 8.2.4.2.3 is invoked with the reference sample width refW, the reference sample height refH, the reference samples refUnfilt[x][y] with x=−1, y=−1 . . . refH−1 and x=0 . . . refW−1, y=−1, and the colour component index cIdx as inputs, and the modified reference samples refUnfilt[x][y] with x=−1, y=−1 . . . refH−1 and x=0 . . . refW−1, y=−1 as output.

6. The reference sample filtering process as specified in clause 8.2.4.2.4 is invoked with the unfiltered samples refUnfilt[x][y] with x=−1, y=−1 . . . refH−1 and x=0 . . . refW−1, y=−1, the transform block width nTbW and height nTbH, the reference sample width refW, the reference sample height refH, and the colour component index cIdx as inputs, and the reference samples p[x][y] with x=−1, y=−1 . . . refH−1 and x=0 . . . refW−1, y=−1 as output.

The intra sample prediction process according to predModeIntra applies as follows:

If predModeIntra is equal to INTRA_PLANAR, the corresponding intra prediction mode process specified in clause 8.2.4.2.5 is invoked with the reference sample array p, the transform block width nTbW, and the transform block height nTbH as inputs, and the output is the predicted sample array predSamples.

Otherwise, if predModeIntra is equal to INTRA_DC, the corresponding intra prediction mode process specified in clause 8.2.4.2.6 is invoked with the transform block width nTbW, the transform block height nTbH, and the reference sample array p as inputs, and the output is the predicted sample array predSamples.

Otherwise if predModeIntra is equal to INTRA_CCLM, the corresponding intra prediction mode process specified in clause 8.2.4.2.8 is invoked with the sample location (xTbC, yTbC) set equal to (xTbCmp, yTbCmp), the prediction block width nTbW and height nTbH, and the reference sample array p as inputs, and the output is the predicted sample array predSamples.

Otherwise, the corresponding intra prediction mode process specified in clause 8.2.4.2.7 is invoked with the intra prediction mode predModeIntra, the transform block width nTbW, the transform block height nTbH, the reference sample width refW, the reference sample height refH, and the reference sample array p as inputs, and the modified intra prediction mode predModeIntra and the predicted sample array predSamples as outputs.

When one of the following conditions is true, the position-dependent prediction combination process specified in clause 8.2.4.2.9 is invoked with the intra prediction mode predModeIntra, the transform block width nTbW, the transform block height nTbH, the predicted samples predSamples [x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

predModeIntra is equal to INTRA_PLANAR
  predModeIntra is equal to INTRA_DC
  predModeIntra is equal to INTRA_ANGULAR18
  predModeIntra is equal to INTRA_ANGULAR50
  predModeIntra is less than or equal to INTRA_ANGULAR10
  predModeIntra is greater than or equal to INTRA_ANGULAR58 refLine is 0

Figure 9:
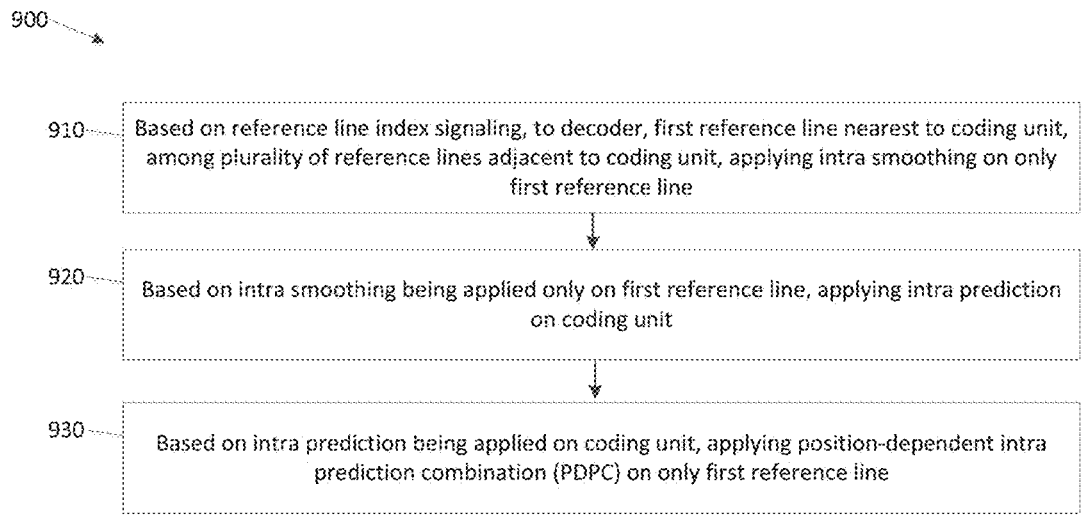
FIG. 9 is a flowchart illustrating a method of controlling intra prediction for decoding of a video sequence, according to an embodiment.

FIG. 9 is a flowchart illustrating a method (900) of controlling intra prediction for decoding of a video sequence, according to an embodiment. In some implementations, one or more process blocks of FIG. 9 may be performed by the decoder (310). In some implementations, one or more process blocks of FIG. 9 may be performed by another device or a group of devices separate from or including the decoder (310), such as the encoder (303).

Referring to FIG. 9, in a first block (910), the method (900) includes based on a reference line index signaling, to a decoder, a first reference line nearest to a coding unit, among a plurality of reference lines adjacent to the coding unit, applying intra smoothing on only the first reference line.

In a second block (920), the method (900) includes, based on the intra smoothing being applied only on the first reference line, applying intra prediction on the coding unit.

In a third block (930), the method (900) includes, based on the intra prediction being applied on the coding unit, applying a PDPC on only the first reference line.

The method (900) may further include applying the intra smoothing on a second reference line among the plurality of reference lines.

The method (900) may further include applying the intra smoothing on other reference lines among the plurality of reference lines, except for a single reference line among the plurality of reference lines.

The method (900) may further include, based on the intra prediction being applied on the coding unit, applying the PDPC on a second reference line among the plurality of reference lines.

The method (900) may further include, based on the intra prediction being applied on the coding unit, applying the PDPC on other reference lines among the plurality of reference lines, except for a single reference line among the plurality of reference lines.

The method (900) may further include determining whether an intra prediction angle corresponding to an intra prediction mode for decoding the video sequence is greater than a predetermined angle corresponding to a diagonal direction of the coding unit, and based on the intra prediction angle being determined to be greater than the predetermined angle, preventing application of the intra smoothing on other reference lines among the plurality of reference lines.

The method (900) may further include determining whether an intra prediction angle corresponding to an intra prediction mode for decoding the video sequence is greater than a predetermined angle corresponding to a diagonal direction of the coding unit, and based on the intra prediction angle being determined to be greater than the predetermined angle, preventing application of the PDPC on other reference lines among the plurality of reference lines.

The method (900) may further include applying the intra smoothing on at least one of other reference lines among the plurality of reference lines, based on an intra prediction mode for decoding the video sequence and an index of the at least one of the other reference lines.

The method (900) may further include determining a threshold index range corresponding to a plurality of intra prediction modes adjacent to a horizontal direction of the coding unit, based on an index of a second reference line among the plurality of reference lines, determining whether a current index value of a current intra prediction mode for decoding the video sequence is within the threshold index range, and based on the current index value being determined to be in the threshold index range, preventing application of the intra smoothing on the second reference line.

The method (900) may further include determining a threshold index range corresponding to a plurality of intra prediction modes adjacent to a vertical direction of the coding unit, based on an index of a second reference line among the plurality of reference lines, determining whether a current index value of a current intra prediction mode for decoding the video sequence is within the threshold index range, and based on the current index value being determined to be in the threshold index range, preventing application of the intra smoothing on the second reference line.

Although FIG. 9 shows example blocks of the method (900), in some implementations, the method (900) may include additional blocks, fewer blocks, different blocks, or differently arranged blocks than those depicted in FIG. 9. Additionally, or alternatively, two or more of the blocks of the method (900) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 10:
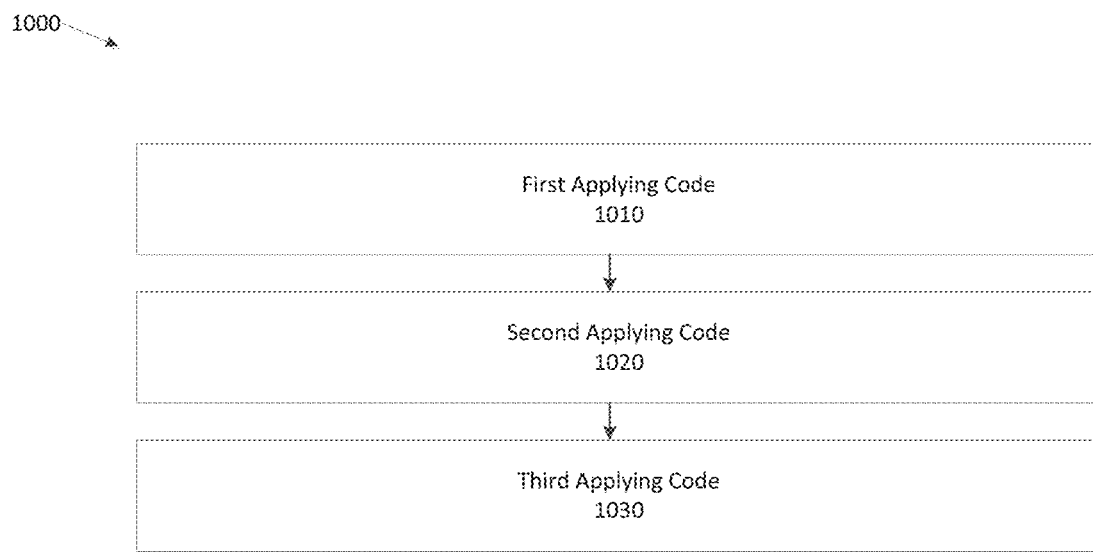
FIG. 10 is a simplified block diagram of an apparatus for controlling intra prediction for decoding of a video sequence, according to an embodiment.

FIG. 10 is a simplified block diagram of an apparatus (1000) for controlling intra prediction for decoding of a video sequence, according to an embodiment.

Referring to FIG. 10, the apparatus (1000) includes first applying code (1010), second applying code (1020), and third applying code (1030).

The first applying code (1010) is configured to based on a reference line index signaling, to a decoder, a first reference line nearest to a coding unit, among a plurality of reference lines adjacent to the coding unit, apply intra smoothing on only the first reference line.

The second applying code (1020) is configured to, based on the intra smoothing being applied only on the first reference line, apply intra prediction on the coding unit.

The selecting code (1030) is configured to, based on the intra prediction being applied on the coding unit, apply a PDPC on only the first reference line.

The first applying code (1010) may be further configured to apply the intra smoothing on a second reference line among the plurality of reference lines.

The first applying code (1010) may be further configured to apply the intra smoothing on other reference lines among the plurality of reference lines, except for a single reference line among the plurality of reference lines.

The third applying code (1030) may be further configured to, based on the intra prediction being applied on the coding unit, apply the PDPC on a second reference line among the plurality of reference lines.

The third applying code (1030) may be further configured to, based on the intra prediction being applied on the coding unit, apply the PDPC on other reference lines among the plurality of reference lines, except for a single reference line among the plurality of reference lines.

The first applying code (1010) may be further configured to determine whether an intra prediction angle corresponding to an intra prediction mode for decoding the video sequence is greater than a predetermined angle corresponding to a diagonal direction of the coding unit, and based on the intra prediction angle being determined to be greater than the predetermined angle, prevent application of the intra smoothing on other reference lines among the plurality of reference lines.

The third applying code (1030) may be further configured to determine whether an intra prediction angle corresponding to an intra prediction mode for decoding the video sequence is greater than a predetermined angle corresponding to a diagonal direction of the coding unit, and based on the intra prediction angle being determined to be greater than the predetermined angle, prevent application of the PDPC on other reference lines among the plurality of reference lines.

The first applying code (1010) may be further configured to apply the intra smoothing on at least one of other reference lines among the plurality of reference lines, based on an intra prediction mode for decoding the video sequence and an index of the at least one of the other reference lines.

The first applying code (1010) may be further configured to determine a threshold index range corresponding to a plurality of intra prediction modes adjacent to a horizontal direction of the coding unit, based on an index of a second reference line among the plurality of reference lines, determine whether a current index value of a current intra prediction mode for decoding the video sequence is within the threshold index range, and based on the current index value being determined to be in the threshold index range, prevent application of the intra smoothing on the second reference line.

The first applying code (1010) may be further configured to determine a threshold index range corresponding to a plurality of intra prediction modes adjacent to a vertical direction of the coding unit, based on an index of a second reference line among the plurality of reference lines, determine whether a current index value of a current intra prediction mode for decoding the video sequence is within the threshold index range, and based on the current index value being determined to be in the threshold index range, prevent application of the intra smoothing on the second reference line.

The techniques described above, can be implemented as computer software using computer-readable instructions and physically stored in one or more computer-readable media.

FIG. 11 is a diagram of a computer system (1100) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 11 for computer system (1100) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (1104), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (1104), or joystick (1105), but there can also be tactile feedback devices that do not serve as input devices), audio output devices (such as: speakers (1109), headphones (not depicted)), visual output devices (such as screens (1110) to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example universal serial bus (USB) ports of the computer system (1100); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators (1144) for certain tasks, and so forth. These devices, along with Read-only memory (ROM) (1145), Random-access memory (RAM) (1146), internal mass storage such as internal non-user accessible hard drives, solid-state drives (SSDs), and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include peripheral component interconnect (PCI), USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling intra prediction for decoding of a video sequence, the method being performed by at least one processor, and the method comprising:
   based on a reference line index, obtaining a first reference line nearest to a coding unit and applying intra-frame smoothing to the first reference line, wherein the first reference line is among a plurality of reference lines adjacent to the coding;
   based on the intra-frame smoothing being applied to the first reference lines, applying an intra-frame prediction to the coding unit;
   applying a position-dependent intra-frame prediction combination (PDPC) to the first reference line based on the intra-frame prediction applied to the coding unit; and
   preventing application of PDPC to any reference line among the plurality of reference lines other than the first reference line.

2. The method of claim 1, wherein method further comprises preventing application of intra-frame smoothing to any reference line among the plurality of reference lines other than the first reference line.

3. The method of claim 1, wherein the method further comprises preventing application of intra-frame smoothing to any reference line among the plurality of reference lines except for a single reference line among the plurality of reference lines.

4. The method of claim 1, further comprising:
   determining whether an intra prediction angle corresponding to an intra prediction mode for decoding the video sequence is greater than a predetermined angle corresponding to a diagonal direction of the coding unit,
   based on the intra prediction angle being determined to be greater than the predetermined angle, determining that the application of the intra smoothing is prevented on other reference lines other than the first reference line, among the plurality of reference lines.

5. The method of claim 1, the method further comprising based on the intra prediction angle being determined to be greater than the predetermined angle, determining that the application of PDPC is prevented on other reference lines other than the first reference line, among the plurality of reference lines.

6. An apparatus for controlling intra prediction for encoding of a video sequence, the apparatus comprising:
   at least one memory configured to store computer program code; and
   at least one processor configured to access the at least one memory and operate according to the computer program code, the computer program code comprising:
      first applying code configured to cause the at least one processor to, based on a reference line index, signal a first reference line nearest to a coding unit and determine that intra-frame smoothing is to be applied to the first reference line, wherein the first reference line is among a plurality of reference lines adjacent to the coding unit;
      second applying code configured to cause the at least one processor to, based on the intra-frame smoothing being applied to the first reference lines, determine that an intra-frame prediction is to be applied to the coding unit;
      third applying code configured to cause the at least one processor to determine that a position-dependent intra-frame prediction combination (PDPC) is to be applied to the first reference line based on the intra-frame prediction being applied to the coding unit; and
      preventing code configured to cause the at least one processor to determine that an application of PDPC to any reference line among the plurality of reference lines other than the first reference line is to be prevented.

7. A method for transmitting a bitstream generated by an encoding method performed by an encoding apparatus, the method comprising:
   based on a reference line index, signaling a first reference line nearest to a coding unit and determining that intra-frame smoothing is to be applied to the first reference line, wherein the first reference line is among a plurality of reference lines adjacent to the coding;
   based on the intra-frame smoothing being applied to the first reference lines, determining that an intra-frame prediction is to be applied to the coding unit;
   determining a position-dependent intra-frame prediction combination (PDPC) is to be applied to the first reference line based on the intra-frame prediction being applied to the coding unit; and
   determining that an application of PDPC to any reference line among the plurality of reference lines other than the first reference line is to be prevented.

8. The method of claim 1, the method further comprising:
   determining an index value range equal to or higher than a specific index value among the plurality of reference lines as a threshold index range, and a plurality of intra-frame prediction modes corresponding to the threshold index range are in the horizontal direction of the coding unit;
   determining whether a current index value of a current intra-frame prediction mode for decoding the video sequence is within the threshold index range, and
   determining that the intra-frame smoothing is prevented from being applied to a second reference line corresponding to the current index value based on the determination that the current index value is within the threshold index range.

9. The method of claim 1, the method further comprising:
determining an index value range equal to or higher than a specific index value among the plurality of reference lines as a threshold index range, and a plurality of intra-frame prediction modes corresponding to the threshold index range in the vertical direction of the coding unit;
determining whether a current index value of a current intra-frame prediction mode for decoding the video sequence is within the threshold index range; determining that the intra-frame smoothing is prevented from being applied to a second reference line corresponding to the current index value based on the determination that the current index value is within the threshold index range.

10. The method of claim 1, wherein the first reference line comprises one or more first reference lines,
wherein the intra-frame smoothing applied to the first reference line comprises applying the intra-frame smoothing to the one or more first reference lines among the plurality of reference lines while preventing the application of intra-frame smoothing to one or more second reference lines among the plurality of reference lines; and
wherein the applying the PDPC to the first reference line comprises applying the PDPC to the one or more first reference lines among the plurality of reference lines while preventing the application of the PDPC to one or more third reference lines among the plurality of reference lines.

11. The method of claim 7, the method further comprising:
determining an index value range equal to or higher than a specific index value among the plurality of reference lines as a threshold index range, and a plurality of intra-frame prediction modes corresponding to the threshold index range are in the horizontal direction of the coding unit;
determining whether a current index value of a current intra-frame prediction mode for encoding the video sequence is within the threshold index range, and
determining that the intra-frame smoothing is to be prevented from being applied to a second reference line corresponding to the current index value based on the determination that the current index value is within the threshold index range.

12. The method of claim 7, the method further comprising:
determining an index value range equal to or higher than a specific index value among the plurality of reference lines as a threshold index range, and a plurality of intra-frame prediction modes corresponding to the threshold index range in the vertical direction of the coding unit;
determining whether a current index value of a current intra-frame prediction mode for encoding the video sequence is within the threshold index range;
determining that the intra-frame smoothing is to be prevented from being applied to a second reference line corresponding to the current index value based on the determination that the current index value is within the threshold index range.

13. The method of claim 7, wherein the first reference line comprises one or more first reference lines,
wherein the intra-frame smoothing to be applied to the first reference line comprises applying the intra-frame smoothing to the one or more first reference lines among the plurality of reference lines while preventing the application of intra-frame smoothing to one or more second reference lines among the plurality of reference lines; and
wherein the PDPC to be applied to the first reference line comprises applying the PDPC to the one or more first reference lines among the plurality of reference lines while preventing the application of the PDPC to one or more third reference lines among the plurality of reference lines.

14. The method of claim 7, wherein method further comprises determining that the application of intra-frame smoothing to any reference line among the plurality of reference lines other than the first reference line is to be prevented.

15. The method of claim 7, wherein the method further comprises determining that application of intra-frame smoothing to any reference line among the plurality of reference lines except for a single reference line among the plurality of reference lines is to be prevented.

16. The method of claim 7, further comprising:
determining whether an intra prediction angle corresponding to an intra prediction mode for encoding the video sequence is greater than a predetermined angle corresponding to a diagonal direction of the coding unit,
based on the intra prediction angle being determined to be greater than the predetermined angle, determining that the application of the intra smoothing is to be prevented on other reference lines other than the first reference line, among the plurality of reference lines.

17. The method of claim 7, the method further comprising based on the intra prediction angle being determined to be greater than the predetermined angle, determining that the application of PDPC is to be prevented on other reference lines other than the first reference line, among the plurality of reference lines.

* * * * *